United States Patent [19]

Taylor

[11] Patent Number: 4,591,033
[45] Date of Patent: May 27, 1986

[54] SHOCK ABSORBER WITH FLUID AMPLIFIED FLOW AT CENTRAL PORTION OF PISTON HEAD

[75] Inventor: Douglas P. Taylor, North Tonawanda, N.Y.

[73] Assignee: Tayco Developments, Inc., North Tonawanda, N.Y.

[21] Appl. No.: 573,574

[22] Filed: Jan. 25, 1984

[51] Int. Cl.⁴ .............................................. F16F 9/36
[52] U.S. Cl. .............................. 188/317; 188/322.22
[58] Field of Search ............... 188/268, 269, 312, 316, 188/317, 322.15, 322.22, 289, 282; 92/181 P, 181 R, 182, 185; 16/51, 66; 138/40, 44

[56] References Cited

U.S. PATENT DOCUMENTS

| | | | |
|---|---|---|---|
| 2,912,069 | 11/1959 | Dillenburger | 188/317 X |
| 2,953,811 | 9/1960 | Hall | 16/66 |
| 3,113,644 | 12/1963 | Wössner | 188/317 X |
| 3,605,801 | 9/1971 | De Carbon | 188/317 X |
| 3,722,640 | 3/1973 | Taylor | 188/316 |
| 3,781,943 | 1/1974 | Cain | 16/66 X |
| 4,064,977 | 12/1977 | Taylor | 188/317 |
| 4,433,759 | 2/1984 | Ichinose | 188/322.15 X |

Primary Examiner—Duane A. Reger
Assistant Examiner—Robert Oberleitner
Attorney, Agent, or Firm—Joseph P. Gastel

[57] ABSTRACT

A shock absorber including a casing, a piston rod having a portion in the casing, a piston head mounted on the piston rod for dividing the casing into chambers on opposite sides thereof, a piston head having a central bore therein having an inner peripheral surface which flares outwardly at opposite ends thereof, and a plurality of interspersed grooves and ridges on the piston rod within the bore for permitting flow of liquid between the chambers to thereby provide fluid amplification through the spaces between the inner peripheral surface of the piston head and the outer peripheral surface of the piston rod.

12 Claims, 4 Drawing Figures

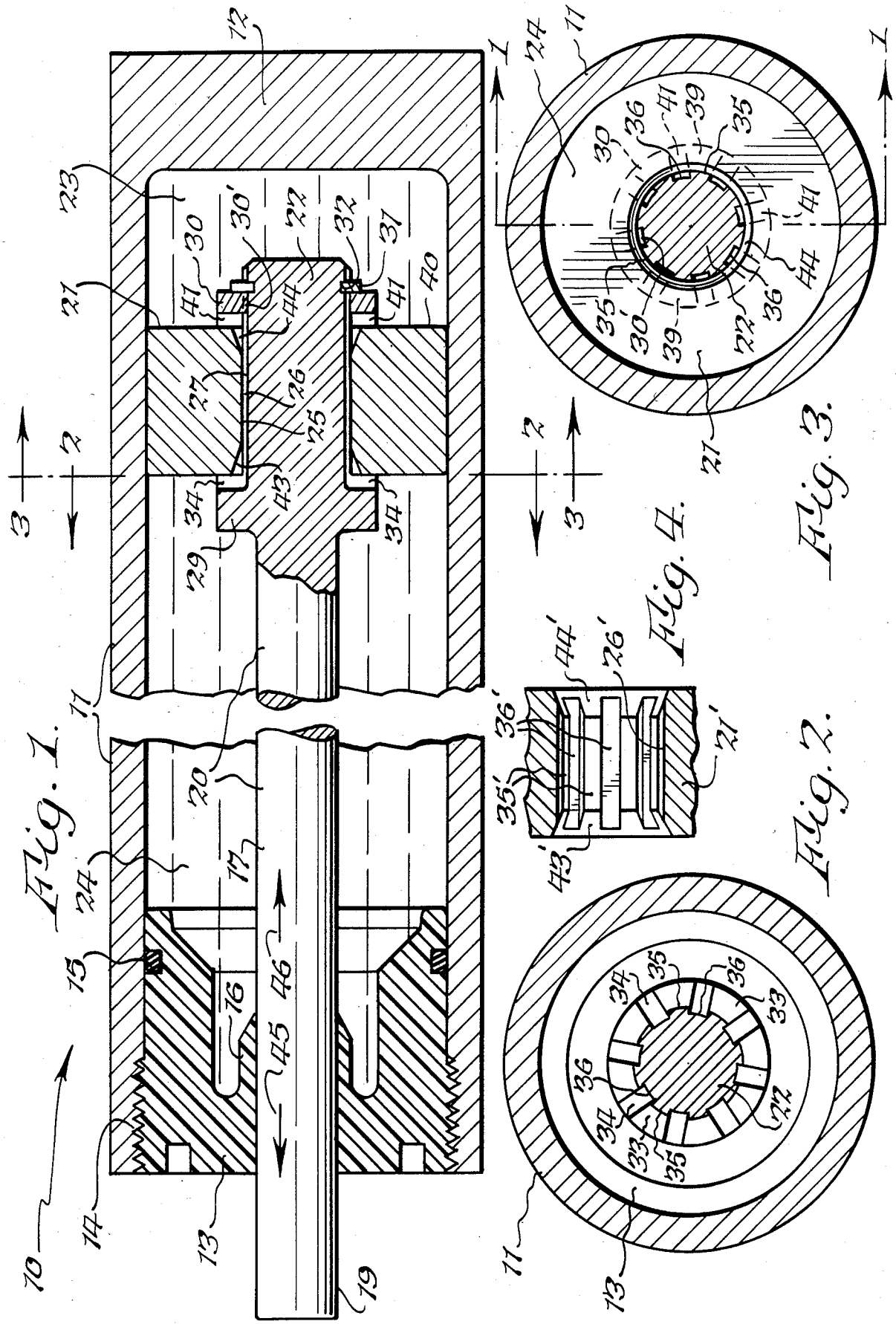

4,591,033

SHOCK ABSORBER WITH FLUID AMPLIFIED FLOW AT CENTRAL PORTION OF PISTON HEAD

BACKGROUND OF THE INVENTION

The present invention relates to a shock absorber having an improved fluid amplification structure therein.

By way of background, fluid amplification is known in shock absorbers. In the past this fluid amplification was obtained by forming DeLaval nozzles in the piston head of the shock absorber or by forming the outer peripheral surface of the piston head in such a manner so that in conjunction with the inner surface of the cylinder it formed a DeLaval nozzle to pass compressible liquid from one side of the piston head to the other during its movement. Forming DeLaval nozzles in the piston head required expensive machining operations. When the DeLaval nozzle was in effect formed on the outer peripheral surface of the piston head, additional structure had to be mounted on the peripheral surface of the piston head to center it within the cylinder, and thus was an expensive procedure.

SUMMARY OF THE INVENTION

It is the object of the present invention to provide an extremely simple and inexpensive DeLaval nozzle structure on the piston head of a shock absorber. Other objects and attendant advantages of the present invention will readily be perceived hereafter.

The present invention relates to a shock absorber comprising a casing, a piston rod having a first portion within said casing and a second portion outside of said casing, an end wall in said casing for mounting said piston rod for movement into and out of said casing, a piston head, a bore centrally located in said piston head, first peripheral portion means on said piston head about said bore for mounting said piston head on said first portion of said piston rod, a second peripheral portion means about said bore of larger diameter than said first peripheral portion to provide a fluid amplification orifice in combination with said first bore, and groove means between said first portion of said piston rod and said bore for passing compressible fluid in a fluid amplified mode from one side of said piston head to the other side thereof. The various aspects of the present invention will be more fully understood when the following portions of the specification are read in conjunction with the accompanying drawings wherein:

BRIEF DESCRIPTION OF THE DRAWINGS

FIG. 1 is a fragmentary cross sectional view of the improved shock absorber taken substantially along line 1—1 of FIG. 3;

FIG. 2 is a cross sectional view taken substantially along line 2—2 of FIG. 1;

FIG. 3 is a cross sectional view taken substantially along line 3—3 of FIG. 1; and FIG. 4 is a fragmentary cross sectional view similar to FIG. 1, with the shaft removed, of an alternate form of piston head wherein all structure of the DeLaval nozzles are formed in the piston head internal diameter.

DESCRIPTION OF THE PREFERRED EMBODIMENTS

The improved shock absorber 10 of the present invention includes a cylindrical casing 11 having an integral end wall 12 and an end wall 13 in the form of a high strength plastic plug which is threaded into casing 11 at 14. An O-ring is located in annular groove 15 to provide sealing with cylinder 11. End wall 13 includes an integral annular seal 16 which is in sealing engagement with piston rod 17 having a first portion 19 outside of the cylinder and a second portion 20 located within the cylinder. End wall 13 may also be fabricated of high strength composite materials, such as a combination of glass fibers and resin, or it may be fabricated of metal and include separate seals.

A piston head 21, which divides casing 11 into chambers 23 and 24, is mounted on piston rod portion 22 of inner piston rod portion 20. Compressible fluid fills chambers 23 and 24 and this compressible fluid may be silicone liquid which is 9.6% compressible at 20,000 psi, or freon which is about 25% compressible at 20,000 psi, or butane which is 20-25% compressible at 20,000 psi, or any other suitable compressible liquid which provides significant compressibility at high pressures.

The shock absorber 10 operates by causing compression of the fluid by displacement of piston rod 20 into chamber 24 and further experiences fluid amplified flow to occur between chambers 23 and 24. This fluid amplified flow is through the space between the peripheral portion 25 of piston head 21 surrounding bore 26 and the outer surface portions 27 of piston rod portion 22. More specifically, piston head 21 is held in position between fixed annular abutment 29 formed integrally with piston rod 20 and a washer-like abutment 30 mounted on piston rod 20 and held in position by means of an annular spring clip 31 which is received in piston rod groove 32.

As can be seen from FIGS. 1 and 2, abutment 29 is fluted at its inner side facing piston head 21 so that there are a series of ribs 33 circumferentially spaced equally about the axis of piston rod portion 22 with a plurality of equally spaced grooves 34 interspersed therewith (FIG. 2). Ribs 33 are aligned with and merge into axial ribs 35 (FIG. 3) which extend longitudinally of the inner end portion 22 of the piston rod and are circumferentialy spaced equally thereabout. Grooves 34 are aligned with and merge into equally spaced longitudinally extending grooves 36 which are located between ridges 35. Abutment 30 has a surface facing piston head 21 which has a configuration which is the mirror image of ribs 33 and grooves 34. In this respect it includes ribs 39 which bear against face 40 of piston head 21 and grooves 41 between ribs 39. It is the ribs 33 and 39 which secure piston head 21 in position against axial movement. A key 30' is preferably provided on member 30 and received in one of the grooves 36 for aligning grooves 36 with grooves 41.

The internal peripheral surface of piston head 21 is flared outwardly at 43 and 44 at opposite sides of central peripheral surface 25 so that there is a peripheral annular flared portion at each side of the piston head which functions to provide fluid amplified flow in conjunction with grooves 36, the fluid flow being through grooves 34, 36 and 41 when the piston head is moving in the direction of arrow 45, and the fluid flow being in the reverse when the piston head is moving in the direction of arrow 45. The angles of flared portions 43 and 44 are preferably between 3° and 20°, or they can be of any desired size depending on the characteristics of the fluid amplification which are required. Fluid amplification by the use of specially shaped piston heads is fully discussed and explained in U.S. Pat. No. 3,722,640 which is incorporated herein by reference.

In FIG. 4 an alternate form of DeLaval nozzle construction is shown wherein the entire structure is located on the piston head 21' which fits on a perfectly cylindrical portion of the piston rod (not shown). The piston head 21' includes a bore having a central portion 26' which merges into flared ends 43' and 44'. Axially extending ribs 35' are equally circumferentially spaced about the inner peripheral surface of the bore and interspersed therewith are equally spaced axially extending grooves 36'. The embodiment of FIG. 4 has the advantage of further ease of fabrication in the sense that it merely requires the boring of a cylindrical hole, flaring the ends, and then forming the ribs and grooves by a broaching operation.

It can thus be seen that the improved fluid amplification structure of the present invention is manifestly capable of achieving the above enumerated objects, and while preferred embodiments of the present invention have been disclosed, it will be appreciated that it is not limited thereto but may be otherwise embodied within the scope of the following claims.

What is claimed is:

1. A shock absorber comprising a casing, a piston rod having a first portion within said casing and a second portion outside of said casing, an end wall in said casing for mounting said piston rod for movement into and out of said casing, a piston head, first and second chambers on opposite sides of said piston head, compressible fluid in said first and second chambers, a bore centrally located in said piston head, first peripheral portion means on said piston head surrounding said bore for mounting said piston head on said first portion of said piston rod, groove means between said first portion of said piston rod and said piston head, and second outwardly flaring peripheral portion means on said piston head surrounding said bore and at opposite ends of said first peripheral portion means and of larger diameter than said first peripheral portion means and forming a continuation thereof for forming a fluid amplification orifice in combination with said first peripheral portion means and said first portion of said shaft and said groove means for passing said compressible fluid between said first and second chambers in both directions of movement of said piston rod.

2. A shock absorber as set forth in claim 1 wherein said groove means are located on said piston rod.

3. A shock absorber as set forth in claim 1 including first and second mounting means on opposite sides of said piston head for securing said piston head on said first portion of said piston rod.

4. A shock absorber as set forth in claim 1 wherein said groove means comprise a plurality of substantially parallel grooves which extend axially of said piston rod on the outer surface thereof.

5. A shock absorber as set forth in claim 1 including first and second abutment means on said piston rod for securing said piston head thereon, and second and third groove means in said first and second abutment means, respectively, in alignment with said groove means.

6. a shock absorber as set forth in claim 1 wherein said groove means are located on said piston rod, first and second abutment means on said piston rod for securing said piston head thereon, second and third groove means in said first and second abutment means, respectively, and means for effecting alignment of said said second and third groove means with said groove means to thereby permit said flow therethrough and through the space between said first portion of said piston rod and said second peripheral portion means which flare outwardly from said first peripheral portion means to thereby provide passage of said compressible fluid between said first and second chambers.

7. A shock absorber as set forth in claim 6 wherein said piston head includes first and second opposite sides, and first and second bearing surfaces on said first and second abutment means, respectively, located between said second and third grooves, respectively, for bearing on said first and second opposite sides, respectively, of said piston head.

8. A shock absorber as set forth in claim 7 wherein said first abutment means is formed integrally with said piston rod, and wherein said means for effecting alignment includes making said second groove means continuations of said groove means, and wherein said second abutment means is separate from said piston rod, and wherein said means for effecting alignment includes a key between said second abutment means and said piston rod.

9. A shock absorber as set forth in claim 1 wherein said groove means are located in said piston head.

10. A shock absorber as set forth in claim 9 including first and second abutment means on said piston rod for securing said piston head thereon, second and third grooves in said first and second abutment means, respectively, and means for effecting alignment of said second and third groove means with said groove means to thereby permit said flow therethrough and through the space between said first portion of said piston rod and said second peripheral portion means which flare outwardly from said first peripheral portion means to thereby provide passage of said compressible fluid between said first and second chambers.

11. A shock absorber as set forth in claim 10 wherein said piston head includes first and second opposite sides, and first and second bearing surfaces on said first and second abutment means, respectively, located between said second and third grooves, respectively, for bearing on said first and second opposite sides, respectively, of said piston head.

12. A shock absorber as set forth in claim 11 wherein said first abutment means is formed integrally with said piston rod, and wherein said means for effecting alignment includes making said second groove means continuations of said groove means, and wherein said second abutment means is separate from said piston rod, and wherein said means for effecting alignment includes a key between said second abutment means and said piston rod.

* * * * *